United States Patent [19]

Stephenson, III et al.

[11] Patent Number: 5,617,168
[45] Date of Patent: Apr. 1, 1997

[54] CAMERA WITH SPOOL POSITIONING MECHANISM

[75] Inventors: Stanley W. Stephenson, III, Spencerport; Tom M. Seamans, Corfu, both of N.Y.

[73] Assignee: Eastman Kodak Company, Rochester, N.Y.

[21] Appl. No.: 432,412

[22] Filed: May 1, 1995

[51] Int. Cl.⁶ .................................................. G03B 1/00
[52] U.S. Cl. ............................................................ 396/413
[58] Field of Search ........................................ 354/212, 214

[56] References Cited

U.S. PATENT DOCUMENTS

| | | | |
|---|---|---|---|
| 2,104,920 | 1/1938 | Ysskin . | |
| 3,005,599 | 10/1961 | Padelt . | |
| 3,161,369 | 12/1964 | Strehle et al. . | |
| 3,481,552 | 12/1969 | Gersch et al. . | |
| 3,586,258 | 6/1971 | Horlezeder . | |
| 3,661,339 | 5/1972 | Shimizu . | |
| 4,149,793 | 4/1979 | Date | 354/214 |
| 4,332,448 | 6/1982 | Zawodny | 354/213 |
| 4,548,304 | 10/1985 | Nagata . | |
| 4,619,509 | 10/1986 | Aoshima et al. | 354/173.1 |
| 4,965,600 | 10/1990 | Smart et al. | 354/212 |
| 5,030,978 | 7/1991 | Stoneham et al. . | |
| 5,209,419 | 5/1993 | Zander . | |
| 5,319,407 | 6/1994 | DiRisio . | |
| 5,453,806 | 9/1995 | Stiehler | 354/173.1 |

FOREIGN PATENT DOCUMENTS

0467644A2  1/1992  European Pat. Off. .

*Primary Examiner*—David M. Gray
*Assistant Examiner*—Daniel Chapik
*Attorney, Agent, or Firm*—Peter J. Bilinski

[57] ABSTRACT

A camera includes a film rewind mechanism that allows manual rewinding of a film spool to a given position. The mechanism includes a one-way clutch that allows the rewind knob to drive the film spool only in a rewind direction. The clutch mechanism has a single arm for transfer of motion between the rewind knob and a spool driver. Use of the single arm clutch allows the rewind knob to be connected with the spool only in a single unique position or phase relation so that the operator can move the rewind knob to an indicated position of the camera body which corresponds with a similarly indicated position of the spool on the film cassette.

8 Claims, 2 Drawing Sheets

5,617,168

CAMERA WITH SPOOL POSITIONING MECHANISM

FIELD OF THE INVENTION

This invention relates to photographic cameras using replaceable film cassettes and, in particular, to cameras using film cassettes with indicia or other means indicating a set position of an inner film spool after rewind of the film used to indicate that the film has been exposed.

BACKGROUND OF THE INVENTION

It is known in the art relating to photographic cameras and film cassette processing to provide a film cassette having external indicia indicating the position of an inner film spool. In use, after the film has been exposed and rewound into the cassette, the film spool is moved to a specified "exposed" position, located by indicia on the cassette, to indicate that the film is exposed. After removal from the camera, the exposed indication on the cassette is relied on by a film processor to indicate the condition of the film as exposed and ready for processing. U.S. Pat. No. 5,030,978, issued Jul. 9, 1991 discloses one form of such a cassette and the manner of its use with a motor driven camera. However, a simple manual rewind mechanism for positioning such a cassette is not shown.

SUMMARY OF THE INVENTION

The present invention provides a camera with a manual rewind mechanism that is capable of (1) disconnecting the cassette film spool from direct connection with the rewind knob when moved in a film advance direction and (2) providing a unique phase relation between the cassette spool and rewind knob when the knob drives the spool in a rewind direction. Thus, positioning the rewind knob at an indicated location relative to the camera body will be effective to locate the cassette spool in the "exposed" position, or another selected position if desired.

The mechanism includes an improved one-way clutch between the rewind knob or crank and the spool driver or lug. The clutch allows free rotation of the spool relative to the rewind knob when the rewind knob is moved in the film advance direction. However, the improved clutch engages the spool driver with the rewind knob at only a single phase location of the two components when the rewind knob is moved in the rewind direction of rotation. Thus a unique relation between the rewind knob and the spool is provided during rewind which allows the camera operator, upon completion of a film rewind operation, to move the rewind knob to a specified location which positions the film spool in the desired position indicating that the film within the cassette is exposed. The specified location of the rewind knob may be indicated by external indicia or by other suitable locating means such as magnetic readers, bar code locators or the like. The cassette may then be removed from the camera and delivered to the film processor with the exposed indication intact and useful for further processing.

In a particular embodiment, the one-way clutch includes a single resilient am having an end that engages a single tooth to connect relatively rotatable elements of the clutch in a single phase angle relationship. Indicia may be provided to indicate the location of the rewind knob that corresponds with the exposed, or other, cassette spool location when moved in the rewind direction.

These and other features and advantages of the invention will be more fully understood from the following detailed description of the invention taken together with the accompanying drawings.

DETAILED DESCRIPTION OF THE INVENTION

Figure 1:
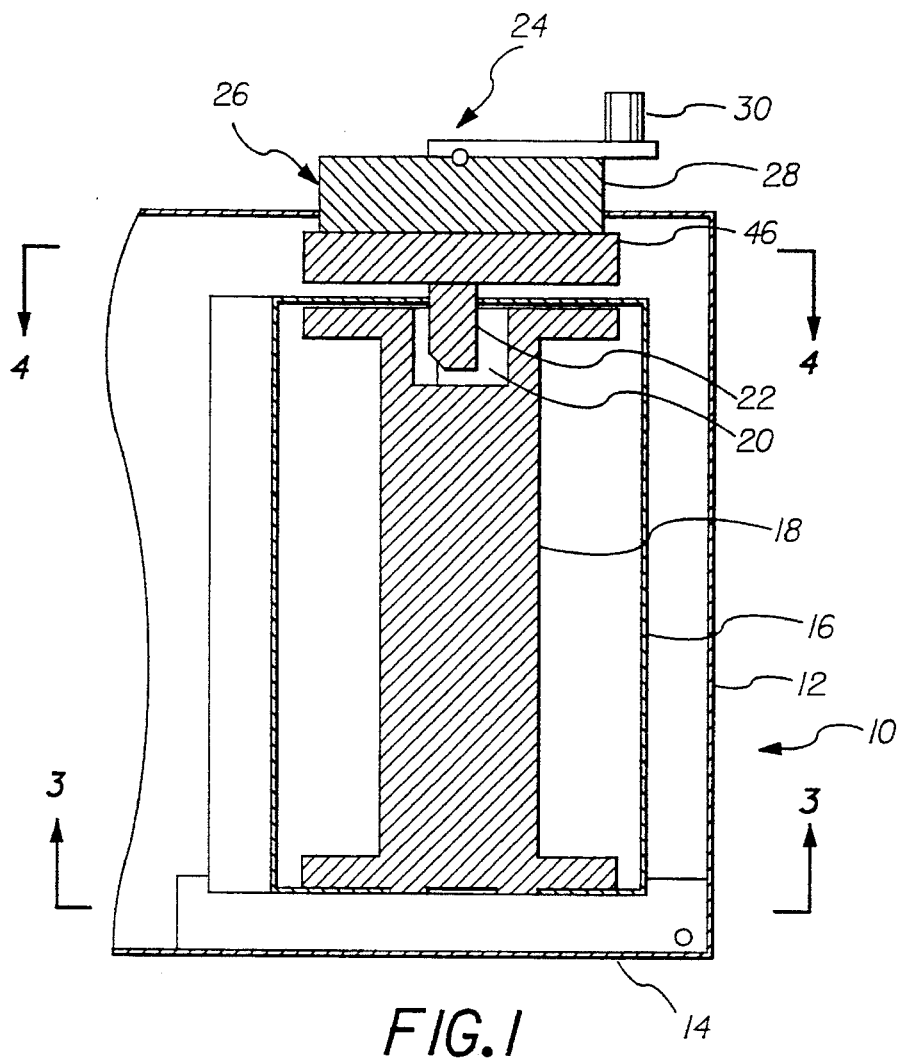
FIG. 1 is a schematic fragmentary cross-sectional view from line 1—1 of FIG. 2 showing a camera having a film cassette and rewind means according to the invention.

Referring now to the drawings in detail, numeral 10 generally indicates a photographic camera having a body 12, one end of which is shown. At this end, a loading door 14 is provided which, when opened, allows a film cassette 16 to be inserted into the body. Cassette 16 encloses a film spool 18 having wound thereon a roll of film, not shown, for exposure in the camera. The film spool includes a recess 20 which drivingly engages a lug 22. The lug 22 forms part of a rewind mechanism 24 which includes a one-way clutch 26 and an external rewind drive in the form of a rewind knob 28 carrying a crank 30.

In accordance with the invention, the film cassette 16 is of a type that includes an external indicator 32 connected with the spool 18 and cooperating with indicia 34,36 on the cassette housing to indicate angularly spaced positions of the film spool 18. These positions 34,36 are used to indicate the condition of the film inside the cassette as exposed or unexposed, respectively. In like manner, the crank 30 is provided with an indicator 38 which, when aligned by rewind rotation with an indicium or location mark 40 on the exterior of the camera body, indicates interior positioning of the film spool in the exposed position.

Figure 2:
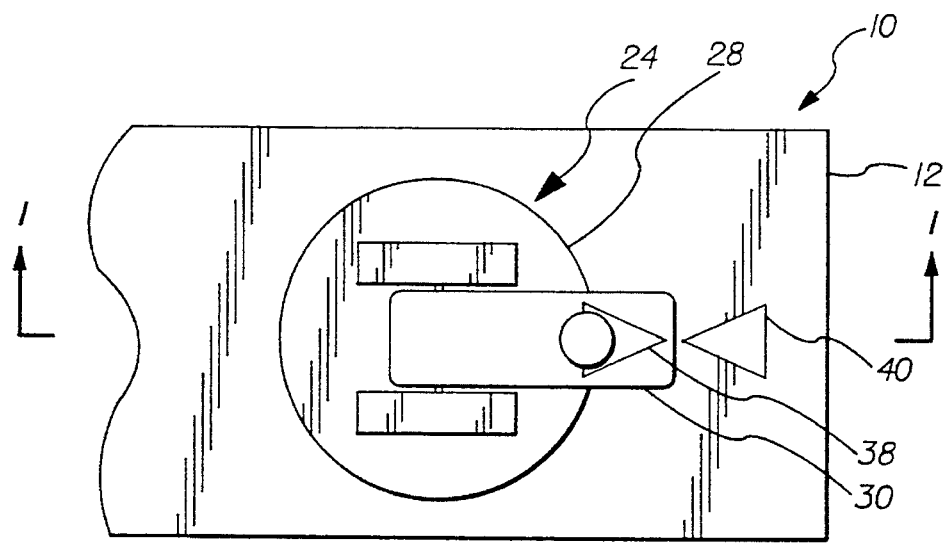
FIG. 2 is a top view of the camera of FIG. 1 showing the rewind knob positioned in an indicia indicated rewind position.
Figure 3:
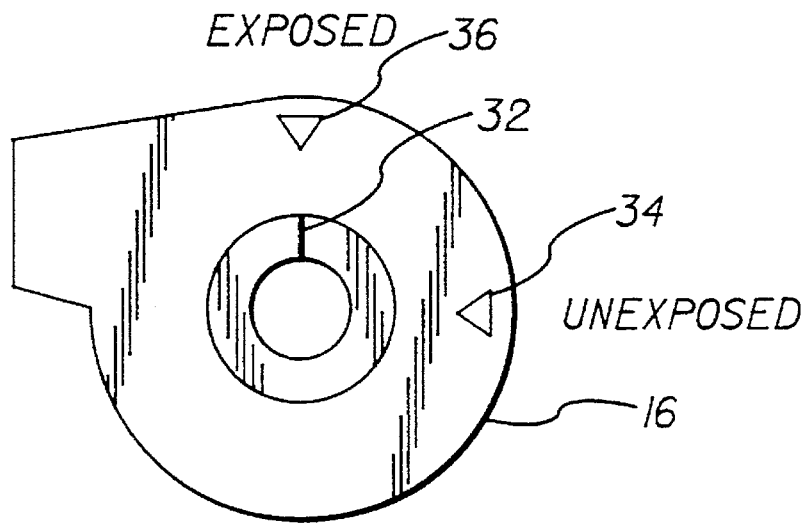
FIG. 3 is a cross-sectional view from line 3—3 of FIG. 1 showing the film cassette positioned in the exposed position.
Figure 4:
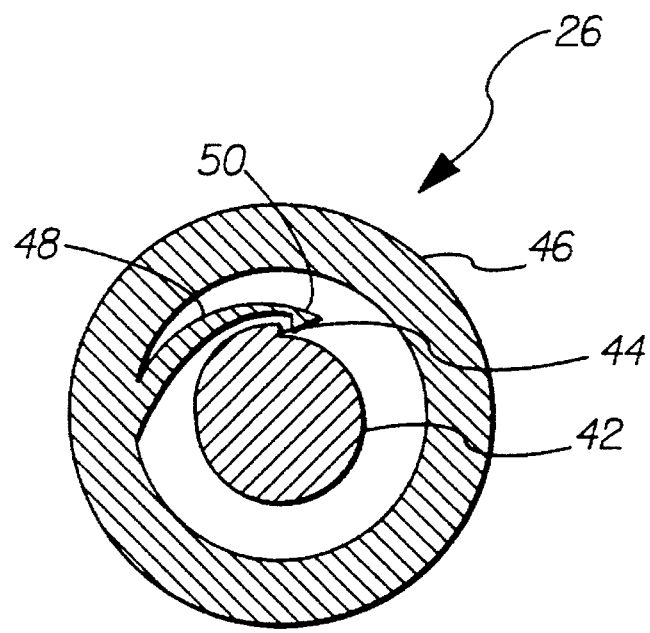
FIG. 4 is a cross-sectional view from line 4—4 of FIG. 1 showing the internal construction of the one-way rewind clutch.

The rewind clutch 26 is provided to disconnect the spool 18 from the rewind knob 28 if the latter is rotated in the film advance direction (clockwise in FIGS. 2–4). This prevents the knob from causing film damage by directly driving the spool in other than a rewind direction (counterclockwise in FIGS. 2–4). In addition, the clutch 26 has the function of connecting the spool 18 with the rewind knob 28 only at a specific phase angle. This angle represents the sum of a first phase angle between an internal spool driver (lug 22) and the spool 18 and a second phase angle determined by the clutch between the lug 22 and an external rewind drive (knob 28 and crank 30) manually actuated by the camera operator.

When the camera operator turns the knob 28 in a rewind direction, it rotates the spool to rewind the film. When rewind is complete, the operator continues knob rotation in the rewind direction to position the crank indicator 38 opposite the exposed locator mark 40. This will place the spool indicator 32 opposite the "exposed" indicium or locator mark 36 of the cassette 16, indicating that the film is now in an exposed condition.

To accomplish this, the interior of clutch 26 has a cam 42 that connects with the lug 22 engaging spool 18. The cam has a single tooth or abutment 44 which faces in a clockwise direction and is faired into the body of the cam in a counterclockwise direction. An annulus 46, connected with knob 28, surrounds the cam 42 and is rotatable coaxially with respect thereto. Annulus 46 carries a resilient arm 48 that extends clockwise as viewed from the top in FIG. 4 and is biased into engagement with the central cam. The arm 48 has a hook-like end 50 which engages the tooth 44 when the annulus 46 is rotated (with knob 28) counterclockwise so as to also rotate the cam 42 counterclockwise with a predetermined phase relationship between the cam and the annulus (and knob). However, if the operator turns the rewind knob 28 in the opposite (clockwise) direction, the hook-end disconnects from the tooth and rides over the surface of the cam without rotating the spool 18 in the film advance direction. This prevents damage to the film and cartridge by improper rotation of the film when rewind of the film is called for.

When the film has been rewound with the hook-end 50 engaging the clutch tooth 44, the camera operator positions rewind knob 28 with the crank indicator 38 opposite the position mark 40 on the camera body. Film spool 18 is thereby automatically positioned in the exposed position in which indicator 32 is opposite the "exposed" position mark 36 on the cassette 16. The film door 14 may then be opened and the cassette removed and delivered to a film processor, who will know from the indicator on the cassette that the film is exposed and ready for processing.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

PARTS LIST 10. camera
12. body
14. door
16. cassette
18. spool
20. recess
22. lug
24. rewind mechanism
26. clutch
28. knob
30. crank
32. indicator
34. indicia
36. indicia
38. indicator
40. indicium (mark)
42. cam
44. tooth or abutment
46. annulus
48. arm
50. end (hook-like)

What is claimed is:

1. A photographic camera comprising:
    a body including a chamber sized for receiving a film cassette having an enclosed spool with photosensitive film wound thereon and first locating means for determining the rotational position of the spool when the cassette is removed from the chamber;
    an internal spool driver for driving the spool;
    an external rewind drive connectable with the spool driver for turning the spool in a rewind direction; and
    a one-way clutch between said spool driver and said rewind drive, is characterized in that:
    said spool driver is connectable with said spool at only a first phase angle, said spool drive having a key-shaped engagement member for engaging a keyway of said spool;
    said clutch engages both said rewind drive and said spool driver at only a second phase angle for rotation in a rewind direction and said clutch permits free rotation in the opposite direction of said rewind drive relative to said spool driver; and
    wherein said camera includes second locating means for determining at least one position of said spool when said clutch is engaged.

2. The invention as in claim 1 characterized in that said clutch includes coaxial relatively rotatable inner and outer members, a resilient arm extending from one of said members into contact with the other and locking means on said members and engagable in only one direction of relative rotation and at said second phase angle for engaging said clutch in said rewind direction.

3. The invention as in claim 2 characterized in that said inner member is a cam and said outer member is an annulus that carries said resilient arm, said arm including a hook-like end engagable during rewind rotation with an abutment on said cam to establish said second phase angle during rewind rotation of said annulus.

4. The invention as in claim 1, wherein said second locating means includes indicia relating said rewind drive and said camera body.

5. The invention as in claim 1, wherein said first locating means includes indicia relating said spool and said cassette.

6. A photographic camera comprising:
    a body sized for receiving a film cassette having an enclosed spool with photosensitive film wound thereon, the cassette including indicia showing the rotational position of the spool when the cassette is removed from the camera;
    an internal spool driver for engaging said spool;
    an external rewind drive connectable with the spool driver for turning the spool in a rewind direction; and a one-way clutch between said spool driver and said rewind drive, is characterized in that:
    said spool driver includes an external engagement feature which is connectable with said spool at only a first phase angle;
    said clutch engages both said rewind drive and said spool driver at only a second phase angle for rotation in a rewind direction and said clutch permits free rotation in the opposite direction of said rewind drive relative to said spool driver; and
    wherein said camera includes indicia indicating at least one position of said spool when said clutch is engaged.

7. The invention as in claim 6 characterized in that said clutch includes coaxial relatively rotatable inner and outer members, a resilient arm extending from one of said members into contact with the other and locking means on said members and engagable in only one direction of relative rotation and at said second phase angle for engaging said clutch in said rewind direction.

8. The invention as in claim 7 characterized in that said inner member is a cam and said outer member is an annulus that carries said resilient arm, said arm including a hook-like end engagable during rewind rotation with an abutment on said cam to establish said second phase angle during rewind rotation of said annulus.

* * * * *